US010097482B2

(12) United States Patent
Zhang (10) Patent No.: US 10,097,482 B2
(45) Date of Patent: Oct. 9, 2018

(54) METHOD, DEVICE, AND SYSTEM FOR NETWORK COMMUNICATION

(71) Applicant: Tencent Technology (Shenzhen) Company Limited, Shenzhen (CN)

(72) Inventor: Xiaolong Zhang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 342 days.

(21) Appl. No.: 14/160,459

(22) Filed: Jan. 21, 2014

(65) Prior Publication Data
US 2014/0325375 A1 Oct. 30, 2014

Related U.S. Application Data

(63) Continuation of application No. PCT/CN2013/087150, filed on Nov. 14, 2013.

(30) Foreign Application Priority Data

Apr. 25, 2013 (CN) .......................... 2013 1 0147751

(51) Int. Cl.
*H04L 12/58* (2006.01)
*G06Q 10/10* (2012.01)
(Continued)

(52) U.S. Cl.
CPC ............. *H04L 51/04* (2013.01); *G06Q 10/10* (2013.01); *G06Q 50/10* (2013.01); *G06Q 50/30* (2013.01); *H04L 51/22* (2013.01)

(58) Field of Classification Search
CPC ........ G06Q 10/10; G06Q 50/10–50/20; H04L 51/04; H04L 51/22
(Continued)

(56) References Cited

U.S. PATENT DOCUMENTS 8,572,493 B2 * 10/2013 Qureshi ................. H04L 51/38
715/742
2006/0009243 A1 * 1/2006 Dahan ................... H04L 12/581
455/466
(Continued)

FOREIGN PATENT DOCUMENTS

CN 1729704 A 2/2006
CN 102736904 A 10/2012

OTHER PUBLICATIONS

Tencent Technology, ISRWO, PCT/CN2013/087150, dated Feb. 20, 2014, 9 pgs.
(Continued)

*Primary Examiner* — Roland J Casillas
(74) *Attorney, Agent, or Firm* — Morgan, Lewis & Bockius LLP (57) ABSTRACT

The present application discloses methods, devices and systems for networking communication and information display. Based on a predefined layout provided by a server, service providers may customize the predefined layout by designating/designing actionable options that may be used in the layout to generate user interfaces. Due to the dual sources of the customized interfaces, some of the actionable options in different interfaces are the same and some of the actionable options are different. A user may select an actionable option displayed at a mobile terminal, which may cause the mobile terminal to send a request to the server, receive a response from the server, and display the response. The current invention allows service providers to configure predefined layouts and present the customized interfaces to users, improving communication experiences while maintaining a level of similarity between the interfaces from different service providers.

18 Claims, 9 Drawing Sheets

(51) Int. Cl.
*G06Q 50/10* (2012.01)
*G06Q 50/30* (2012.01)

(58) Field of Classification Search
USPC .......................................................... 715/744
See application file for complete search history.

(56) References Cited

U.S. PATENT DOCUMENTS

| | | | |
|---|---|---|---|
| 2006/0271696 A1* | 11/2006 | Chen | H04L 51/04 709/229 |
| 2008/0040673 A1* | 2/2008 | Zuckerberg | G06F 17/30867 715/745 |
| 2011/0258541 A1* | 10/2011 | Sano | G06F 3/0483 715/702 |
| 2012/0157165 A1* | 6/2012 | Kim | G06F 21/6218 455/566 |
| 2013/0145448 A1* | 6/2013 | Newell | G06F 21/31 726/7 |
| 2014/0149870 A1* | 5/2014 | Griffin | G06F 3/0233 715/728 |

OTHER PUBLICATIONS

Tencent Technology, IPRP, PCT/CN2013/087150, dated Oct. 27, 2015, 5 pgs.

* cited by examiner

METHOD, DEVICE, AND SYSTEM FOR NETWORK COMMUNICATION

RELATED APPLICATIONS

This application is a continuation application of PCT Patent Application No. PCT/CN2013/087150, entitled "METHOD, DEVICE, AND SYSTEM FOR NETWORK COMMUNICATION" filed Nov. 14, 2013, which claims priority to Chinese Patent Application No. 201310147751.1, "Method, Device, and System for Network Communication," filed on Apr. 25, 2013, both of which are hereby incorporated by reference in their entirety.

FIELD OF THE INVENTION

The present application relates to the field of network technology, and in particular to a method, device, and system for network communication.

BACKGROUND OF THE INVENTION

With the continuing development of network technologies such as the Internet, functions of mobile smart phones have also been significantly enriched. A user can log in an Instant Messenger (IM) server from a phone and connect to other users of the IM by scanning the two-dimensional codes of a public account with the scanning plug-in provided by the IM server. The public account is managed by a service provider that is associated with the public account, which may be used for the distribution of texts, videos and/or pictures in one-to-many fashion. After successful configuration to follow the public account, e.g. by scanning the two-dimensional code, the user using a follower terminal, such as a mobile terminal, may follow the public account through the IM server. When the IM server receives information and/or messages that are marked to be distributed, the IM server may push such information and/or messages to the mobile terminals associated with the users.

However, in practice, the service provider generally transmits the information to be distributed to the IM server periodically and then the IM server pushes the information to the mobile terminals and the users. The service provider cannot respond to user operations to push the information, thus reducing the effective utilization of resources of the public account. In addition, it is desirable to have customizable menus and layouts that may be configured by the service providers, so that the users may access the information provided by the service providers with more accuracy and efficiency.

Accordingly, it is necessary and desirable to provide a new technology, so as to resolve the technical problem and improve the above-mentioned approach.

SUMMARY

The above deficiencies and other problems associated with network communication and information display are reduced or eliminated by the invention disclosed below. In some embodiments, the invention is implemented in a computer system such as a mobile terminal that has one or more processors, memory and one or more modules, programs or sets of instructions stored in the memory for performing multiple functions. Instructions for performing these functions may be included in a computer program product configured for execution by one or more processors.

One aspect of the invention involves a computer-implemented method performed by a mobile terminal. The mobile terminal may display a first interface associated with a first service provider, the first interface including a first set of actionable options arranged in a predefined layout, each option having an associated operation defined by the first service provider. In response to a user selection of one of the actionable options in the first set, the mobile terminal may submit a request to a remote server, receive a response from the remote server, and display the response on the display of the mobile terminal. Upon detecting a user request to switch from the first interface associated with the first service provider to a second interface associated with a second service provider, the mobile terminal may display the second interface associated with the second service provider, the second interface including a second set of actionable options arranged in the predefined layout, wherein at least one of the second set of actionable options is different from the first set of actionable options, at least one of the second set of actionable options is the same as the first set of actionable options, and each option has an associated operation defined by the second service provider. In response to a user selection of one of the actionable options in the second set, the mobile terminal may submit a request to the remote server, receive a response from the remote server, and display the response on the display of the mobile terminal.

Another aspect of the invention involves a computer system. The computer system may comprise a mobile terminal, wherein the mobile terminal has one or more processors, memory, and one or more program modules stored in the memory and configured for execution by the one or more processors, the one or more program modules including: a display module configured to display a first interface associated with a first service provider, the first interface including a first set of actionable options arranged in a predefined layout, each option having an associated operation defined by the first service provider; a communication module configured to submit a request to a remote server and receive a response from the remote server, in response to a user selection of one of the actionable options in the first set, wherein the display module is further configured to display the response on the mobile terminal; and an input module configured to detect a user request to switch from the first interface associated with the first service provider to a second interface associated with a second service provider; wherein the display module is further configured to display the second interface associated with the second service provider, the second interface include a second set of actionable options arranged in the predefined layout, at least one of the second set of actionable options is different from the first set of actionable options, at least one of the second set of actionable options is the same as the first set of actionable options, each option of the second set has an associated operation defined by the second service provider, the communication module is further configured to submit a request to the remote server and receive a response from the remote server in response to a user selection of one of the actionable options in the second set, and the display module is further configured to display the response on the mobile terminal.

Another aspect of the invention involves a non-transitory computer readable storage medium having stored therein instructions, which, when executed by a mobile terminal, cause the mobile terminal to: display a first interface associated with a first service provider, the first interface including a first set of actionable options arranged in a predefined layout, each option having an associated operation defined by the first service provider; in response to a user selection of one of the actionable options in the first set, submit a request to a remote server, receive a response from the remote server, and display the response on the display of the mobile terminal; detect a user request to switch from the first interface associated with the first service provider to a second interface associated with a second service provider; display the second interface associated with the second service provider, the second interface including a second set of actionable options arranged in the predefined layout, wherein at least one of the second set of actionable options is different from the first set of actionable options, at least one of the second set of actionable options is the same as the first set of actionable options, and each option has an associated operation defined by the second service provider; and in response to a user selection of one of the actionable options in the second set, submit a request to the remote server, receive a response from the remote server, and display the response on the display of the mobile terminal.

Some embodiments may be implemented on one or more computer devices in a network environment.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

Figure 1:
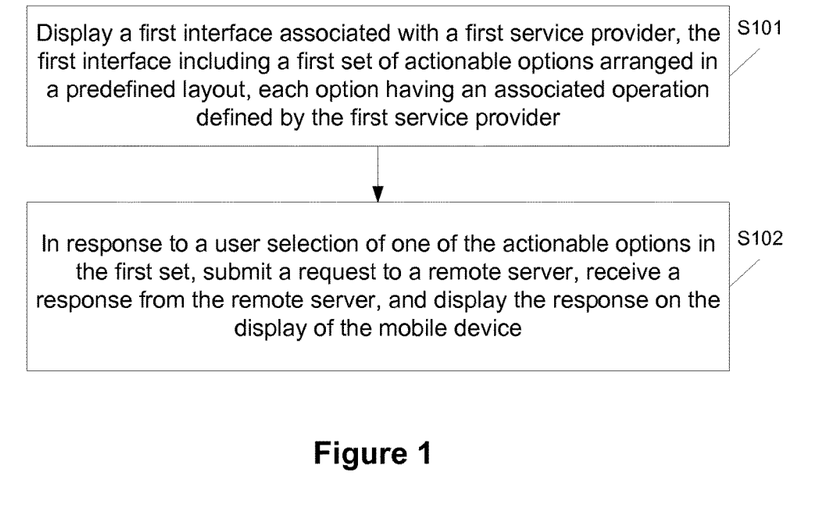
FIG. 1 is a flowchart illustrative of a network communication method by a mobile terminal in accordance with some embodiments of the current invention.

FIG. 1 is a flowchart illustrative of a network communication method by a mobile terminal in accordance with some embodiments of the current invention.

As shown in step S101 of FIG. 1, a mobile terminal may display a first interface associated with a first service provider, the first interface including a first set of actionable options arranged in a predefined layout, each option having an associated operation defined by the first service provider.

The mobile terminal serves as an example of any computing device that has networking and data processing capabilities, such as but not limited to servers, workstations, personal computer such as desktops and laptops, and mobile terminals such as smart phones (e.g. Android® or IOS® phones), tablet computers, personal digital assistants (PDAs), and other mobile internet devices (MID). The service provider may refer to any computers, devices and/or entity that manage public accounts. The public accounts may be presented through a server to the mobile terminals when the mobile terminals choose to follow or access the public accounts.

In some embodiments, the service providers may configure and customize the predefined formats based on the needs of the service provider to produce interfaces that are associated with the service provider, each interface including at least a set of actionable options, wherein the actionable options are arranged in a predefined layout. In some embodiments, the predefined layout is defined by the server, wherein the predefined layout may include some basic formats and options that cannot be changes and some flexible features that may be customized by the service providers.

As shown in step S102 of FIG. 1, in response to a user selection of one of the actionable options in the first set, the mobile terminal may submit a request to a remote server, receive a response from the remote server, and display the response on the display of the mobile device.

The remote server may be any computing device that has networking and data processing capabilities, such as but not limited to servers, workstations, personal computer such as desktops and laptops, and mobile terminals. The remote server may also include a number of computing devices connected by operable networks.

In some embodiments, the server provides the predefined layout to the service providers; the service providers customize interfaces using the predefined layouts; the service providers assign the customized interfaces to the public accounts associated with the service providers; and the service provider transmits the customized interfaces to the server so that upon a request from the user, the server may present the interfaces to the user.

Figure 2:
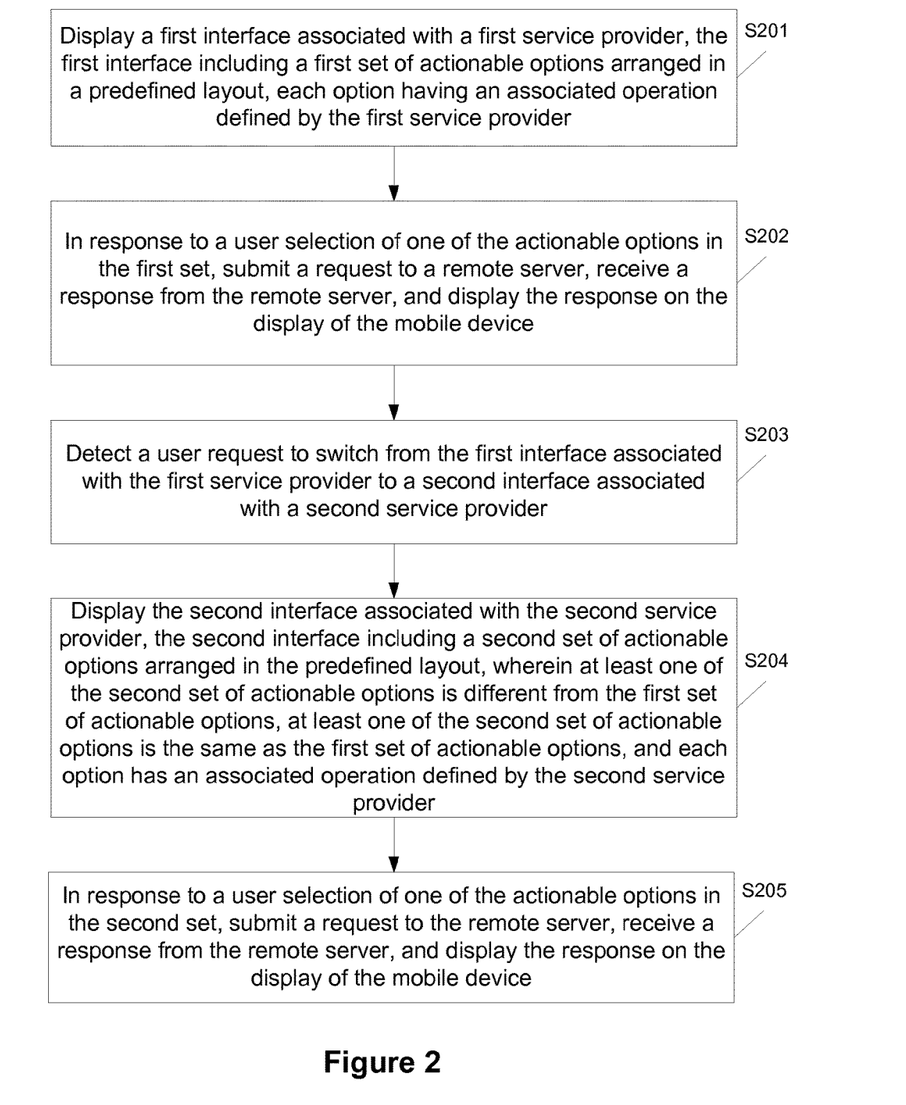
FIG. 2 is a flowchart illustrative of a network communication method by a mobile terminal in accordance with some embodiments of the current invention, providing more details and alternatives.

FIG. 2 is a flowchart illustrative of a network communication method by a mobile terminal in accordance with some embodiments of the current invention, providing more details and alternatives.

Figure 3A:
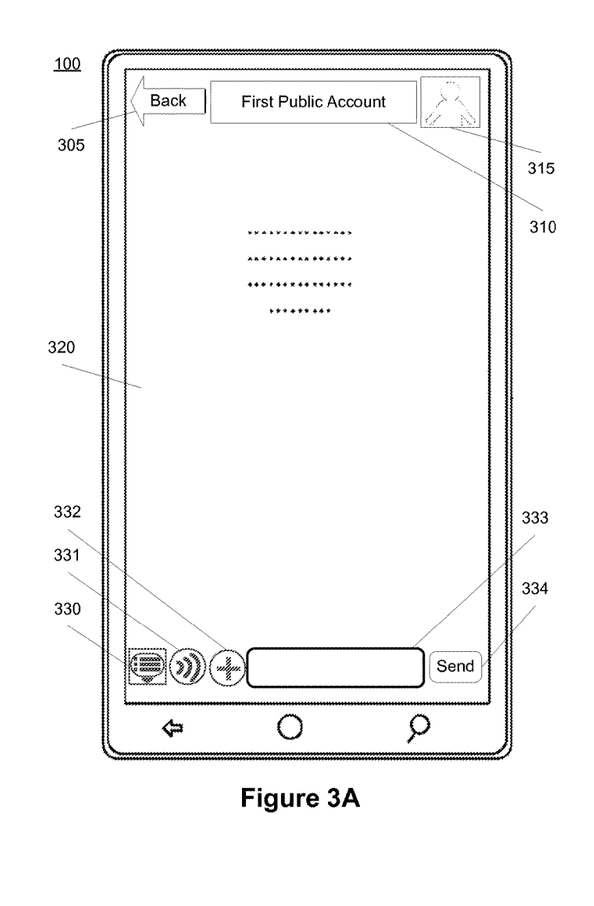
FIGS. 3A and 3B are illustrative screen shots of a mobile terminal when the mobile terminal displays interfaces associated with a first public account, in accordance with some embodiments of the current invention.
Figure 3B:
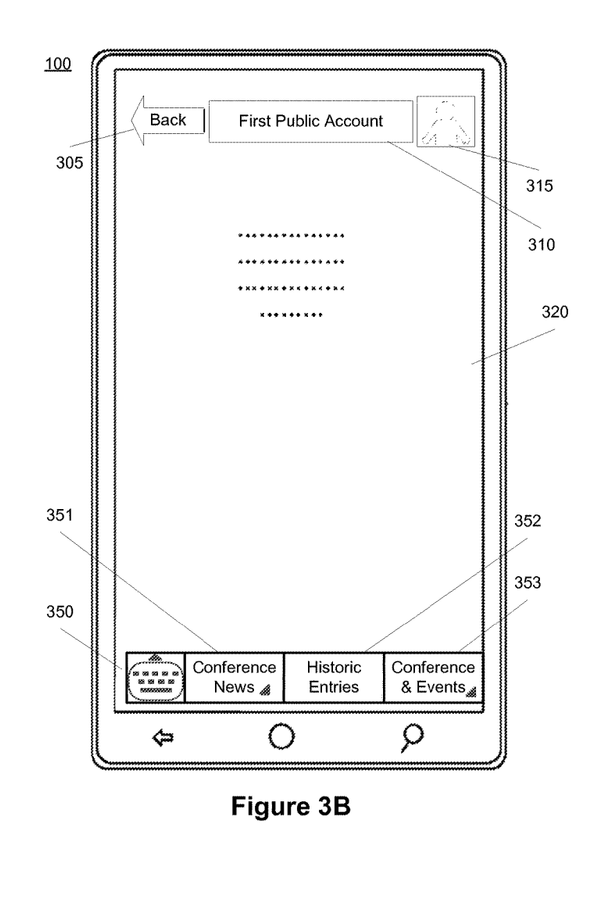

FIGS. 3A and 3B are illustrative screen shots of a mobile terminal when the mobile terminal displays interfaces associated with a first public account, in accordance with some embodiments of the current invention.

Figure 4A:
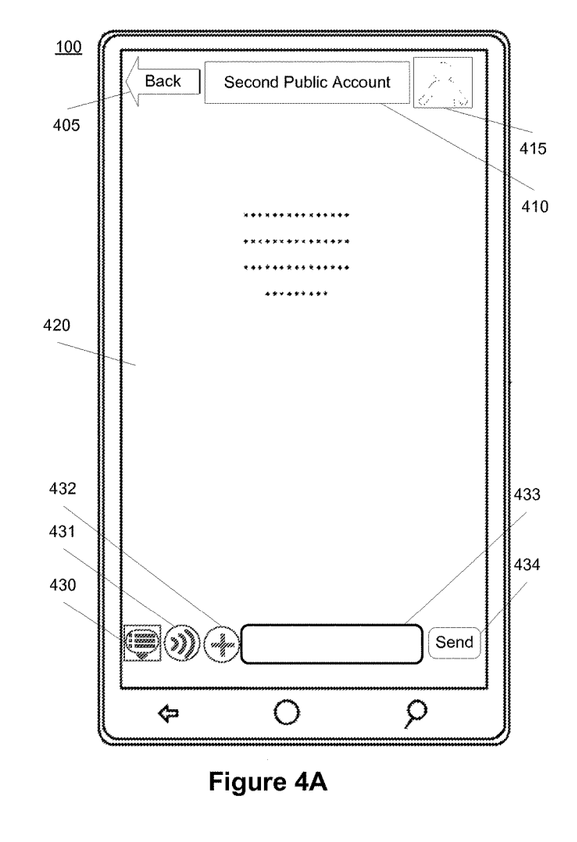
FIGS. 4A and 4B are illustrative screen shots of a mobile terminal when the mobile terminal displays interfaces associated with a second public account, in accordance with some embodiments of the current invention.
Figure 4B:
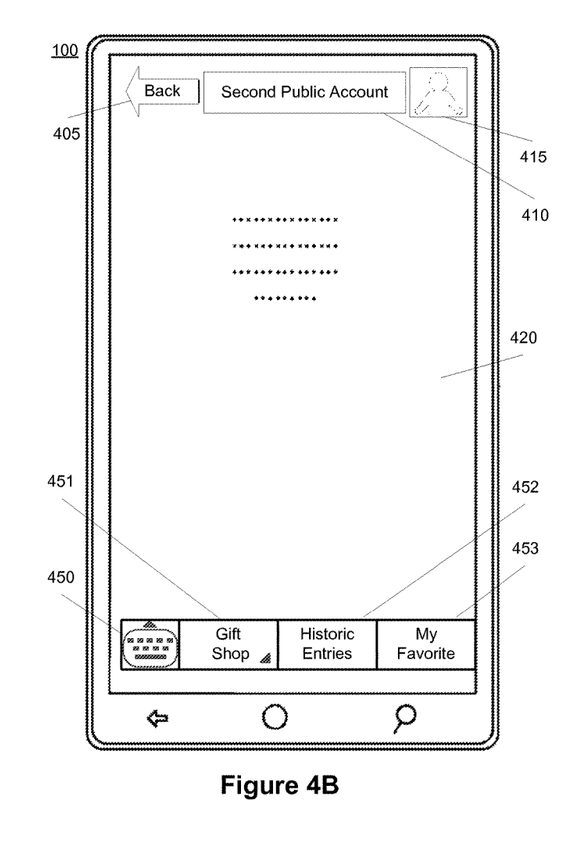

FIGS. 4A and 4B are illustrative screen shots of a mobile terminal when the mobile terminal displays interfaces associated with a second public account, in accordance with some embodiments of the current invention.

Steps S201 and S202 of FIG. 2 are similar to steps S101 and S102 of FIG. 1. In particular, step S201 indicates that the mobile terminal may display a first interface associated with a first service provider, the first interface including a first set of actionable options arranged in a predefined layout, each option having an associated operation defined by the first service provider. In addition, step S202 shows that in response to a user selection of one of the actionable options in the first set, the mobile terminal may submit a request to a remote server, receive a response from the remote server, and display the response on the display of the mobile device. The first interface may include more than one displayable interface that may be associated with a first public account and the first service provider.

The interfaces shown in FIGS. 3A, 3B, 4A, and 4B are examples of customized interfaces based on a predefined layout, wherein the layout is defined by the server and the customization is conducted by the service providers. The specific format and arrangement of the interfaces may vary according to the setup of the server and the design of the service providers.

The interfaces may include a number of actionable options wherein each option may have an associated operation defined by the first service provider. When an actionable option is selected, e.g. by click, the operation associated with the actionable option may be triggered and result in a series of actions as indicated in step S202—submitting a request to the server, receiving a response, and displaying the response. However, it should also be noted that the series of actions listed in S202 are not a requirement. In some scenarios the operation may be carried out entirely by the mobile terminal. At least in some embodiments, the selection of the actionable options results in the actions in step S202.

Referring to FIGS. 3A and 3B, which illustrate examples of interfaces provided by a first public account that is associated with a first service provider. Shown in FIG. 3A is a mobile terminal 100 displaying an input interface of the first public account, wherein the input interface includes a back button 305, a title 310, and a service provider information button 315 arranged at the top of the display, an information display switch button 330, a verbal input switch button 331, a variety input switch button 332, an input area 333, and a send button 334 arranged at the bottom of the display. The input interface also includes a main display area 320. Shown in FIG. 3B is a mobile terminal 100 displaying an information display interface of the first public account, wherein the information display interface includes a back button 305, a title 310, and a service provider information button 315 arranged at the top of the display, an input switch button 350, a first topic button 351, a second topic button 352, and a third topic button 353 arranged at the bottom of the display. The information display interface also includes a main display area 320, which may be used to display the contents when the actionable options are selected.

In some embodiments, selection of the back button 305 may result in display of information previously accessed in the main display area 320; selection of the service provider information button 315 may result in display of information, such as but not limited to name, address, and brief description of the business, of the first service provider associated with the first public account. In addition, in some embodiments, selection of the information display switch button 330 may result in switching form display of the input interface shown in FIG. 3A to the information display interface shown in FIG. 3B; selection of the verbal input switch button 331 may result in switching to a verbal input format; selection of the variety input switch button 332 may result in switching to an input format that allows pasting picture or links; and selection of the send button 334 may result in transmitting the input contents in the input area 333 to the server.

Referring to FIG. 3B, in some embodiments, selection of the back button 305 and the service provider information button 315 may result in the same responses as described for FIG. 3A. In addition, selection of the input switch button 350 may result in switching from the information display interface to an input interface; selection of the first topic button 351, the second topic button 352, or the third topic button 353 may result in display of information that are extracted from the response from the server. The information may include but not be limited to any combination of pictures, passages, a list of links, and/or a list of topics, which may also be actionable options that may result in further display of information when selected.

Each topic button may have its own designation and design, wherein such designation and design may be provided by the service provider based on the predefined layout from the server. For example, in some embodiments, the predefined layout may limit the number of topic buttons to three or less and the topic buttons are arranged at the bottom of the display in parallel; in such cases, the first service provider, e.g. a conference organizer, must follow the number and location of the predefined layout but may provide unique designation for the topic buttons. For example, referring to FIG. 3B, selection of the first topic button 351 may result in the display of conference news; selection of the second topic button 352 may result in the display of historic entries from the users; and selection of the third topic button 353 may result in the display of on-going and/or future conferences and events. In addition, the contents/information associated with the topic buttons may be provided by the service provider to the server. The same general rules of actionable option designation and predefined layout limitations may apply to all the actionable options and the customization by the service providers.

The actionable options in general may also vary from the actionable options shown in FIGS. 3A, 3B, 4A, and 4B. In some embodiments, the actionable option may be a communication option, such as "click to like;" or the actionable option may be customized links with embedded URL, such as the "homepage of the public provider."

If the actionable options are considered customized menu choices, in some embodiments, the selection of a menu choice may result in the display of a secondary menu. For example, selection of the first topic button 351 in FIG. 3B may result in the display of a number of sub-topic buttons related to conference new. The menu choices that may trigger further actionable options may be marked, e.g. with small triangles at the corner of the button.

Referring to FIG. 2, step S203 shows that the mobile terminal may detect a user request to switch from the first interface associated with the first service provider to a second interface associated with a second service provider. In addition, according to step S204, the mobile terminal may display the second interface associated with the second service provider, the second interface including a second set of actionable options arranged in the predefined layout, wherein at least one of the second set of actionable options is different from the first set of actionable options, at least one of the second set of actionable options is the same as the first set of actionable options, and each option has an associated operation defined by the second service provider. In some embodiments, as shown in step S205, in response to a user selection of one of the actionable options in the second set, the mobile terminal may submit a request to the remote server, receive a response from the remote server, and display the response on the display of the mobile device.

Referring to FIGS. 4A and 4B, which illustrate examples of the interfaces provided by a second public account that is associated with a second service provider. Shown in FIG. 4A is a mobile terminal 100 displaying an input interface of the first public account, wherein the input interface includes a back button 405, a title 410, and a service provider information button 415 arranged at the top of the display, an information display switch button 430, a verbal input switch button 431, a sticker input switch button 432, an input area 433, and a send button 434 arranged at the bottom of the display. The input interface also includes a main display area 420. Shown in FIG. 4B is a mobile terminal 100 displaying an information display interface of the first public account, wherein the information display interface includes a back button 405, a title 410, and a service provider information button 415 arranged at the top of the display, an input switch button 450, a first topic button 451, a second topic button 452, and a third topic button 453 arranged at the bottom of the display. The information display interface also includes a main display area 420.

A user may choose to send a request through the input mechanisms of the mobile terminal to switch from displayable interfaces associated with the first service provider to the displayable interfaces associated with the second service provider. After detecting the request, the mobile terminal may switch between from any displayable interfaces of the first service provider to any displayable interfaces of the second service provider.

In some embodiments, some actionable options are the same for the interfaces associated with the first service provider and the interfaces associated with the second service provider. For example, each pair of the back buttons 305 and 405, the service provider information buttons 315 and 415, the information display switch buttons 330 and 430, the verbal input switch buttons 331 and 431, the sticker input switch buttons 332 and 432, the send buttons 334 and 434, and the input switch buttons 350 and 450 may have the same functions, appear at the same locations, and have the same appearances. In some embodiments, the similarities are due to the predefined layout, which is provided by the server and does not allow customization related to certain aspects of the actionable options. In some embodiments, the similarities may be due to uniform choices by the service providers regarding customizable options.

Referring to FIGS. 4B and 3B, the topic buttons 451, 452, and 453 are arranged at the same positions as the topic buttons 351, 352, and 353, respectively. The functions of the respective topic buttons, however, may be the same or different. For example, the second topic buttons 352 and 452 may have the same function—displaying historic entries from users, though the result of the display may be different because the entries are different. However, the respectively first topic buttons 351 and 451 and the third topic buttons 353 and 453 may have different functions. For example, selecting the first topic button 451 may result in the display of a gift shop—different from the results of selecting the first topic button 351; and selecting the third topic button 453 may result in the display of personal favorite choices by the user—different from the results of selecting the third topic button 353.

All the similarities and differences between the actionable options may be from two sources—the setup of the predefined layout by the server and the designation/design of the service providers. In some embodiments, the interfaces may include a number of preset locations, wherein the actionable options are presented in the preset locations and the same actionable options are presented at the same location—e.g. the back buttons 305 and 405, the service provider information buttons 315 and 415, the information display switch buttons 330 and 430, the verbal input switch buttons 331 and 431, the sticker input switch buttons 332 and 432, the send buttons 334 and 434, the input switch buttons 350 and 450, and the second topic buttons 352 and 452. In some embodiments, the interfaces may include a number of different actionable options—e.g. the first topic buttons 351 and 451 and the third topic buttons 353 and 453.

In general, a set of actionable options from any service provider may include a same option allowing user to input information. In addition, a set of actionable options from any service provider may include a same option associated with switching between user input formats, wherein the user input formats comprise a verbal input format and a written input format.

The dual sources of the customized interfaces provide specific benefits regarding communication and display. The predefined layout limit the variations that may be introduced into the interfaces, allowing the user (followers of public accounts associated with the service providers) to stay familiar with the basic appearance and outlook of the interfaces. Therefore, it does not take a user a long time to learn and get familiar with a new service provider's interfaces. On the other hand, some the actionable options may be configured by the service providers, allowing a certain level of flexibility to accommodate the specific business needs of the service providers.

Figure 5:
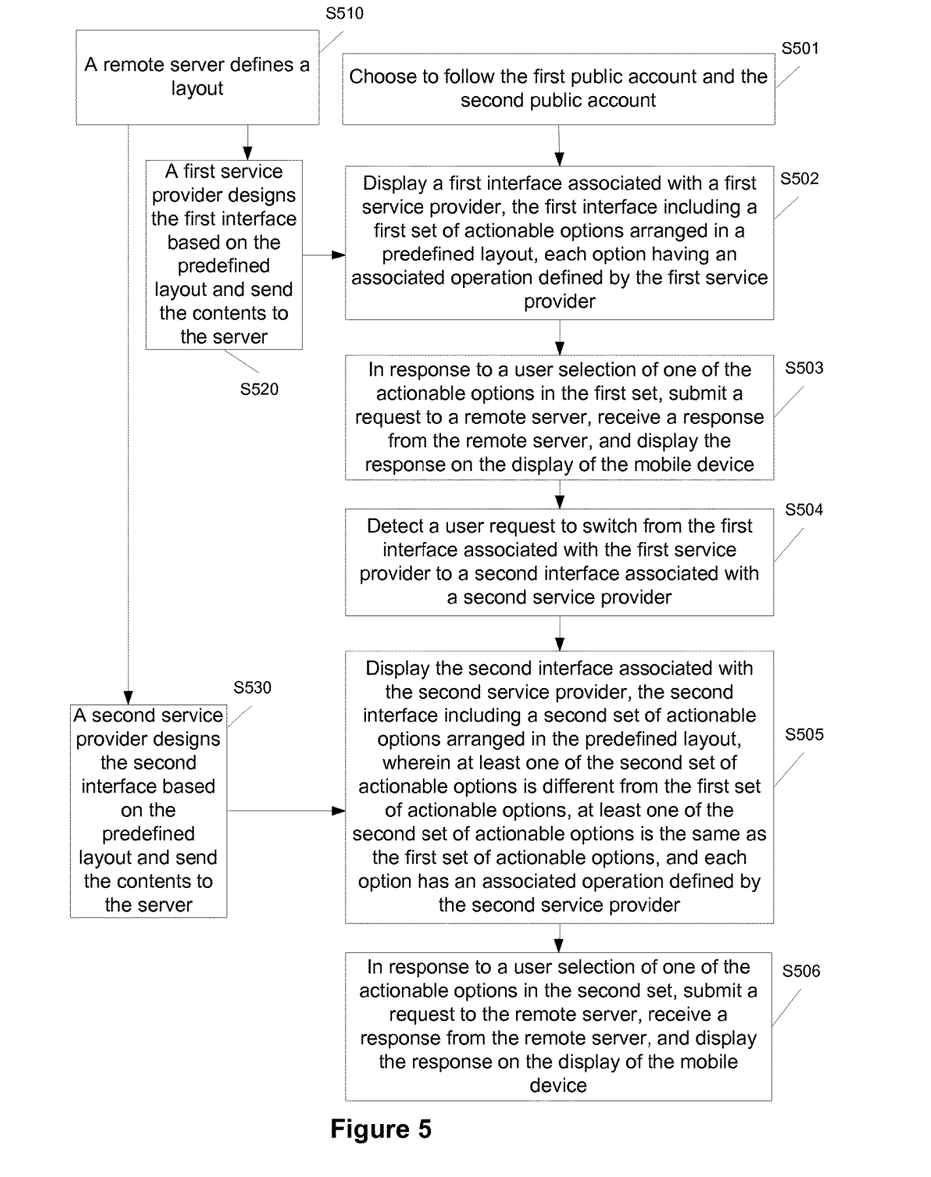
FIG. 5 is a flowchart illustrative of a network communication method by a computer system including a server, service providers, and a mobile terminal in accordance with some embodiments of the current invention, providing more details and alternatives.
Figure 6:
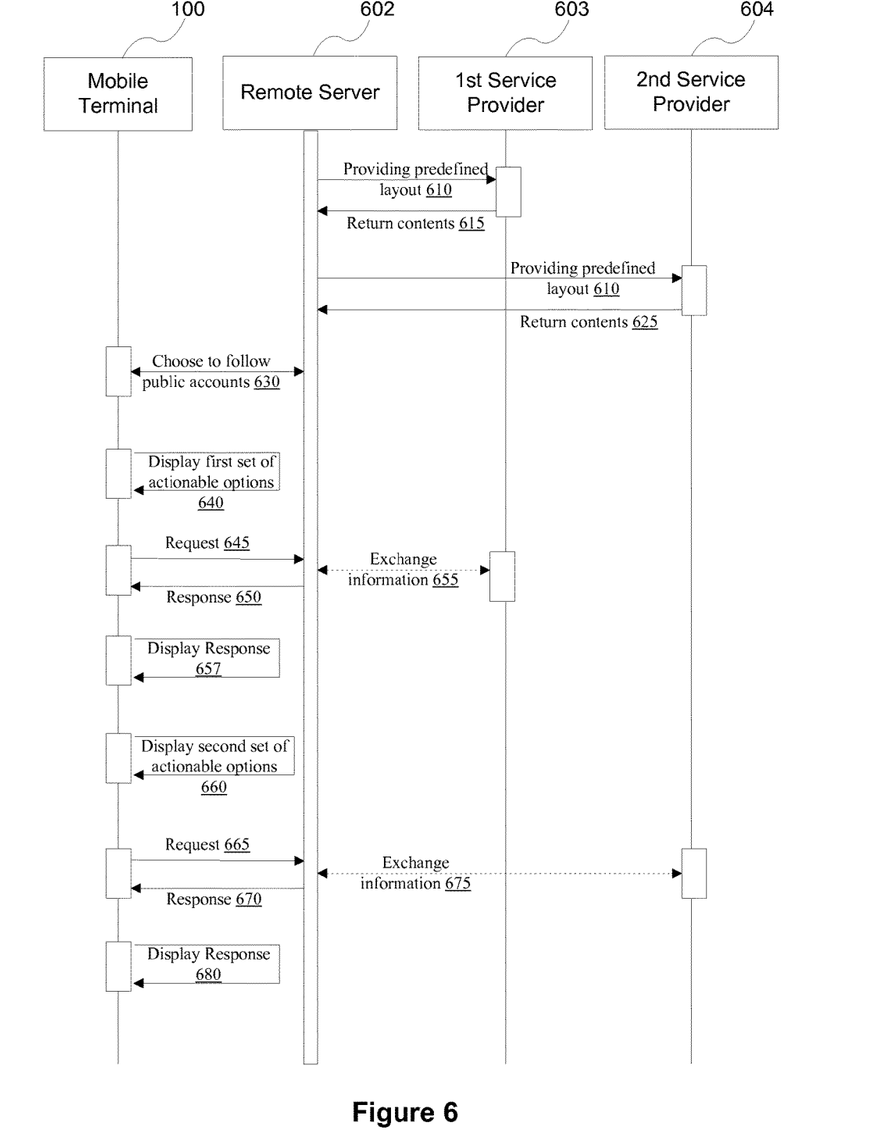
FIG. 6 is a schematic illustration of how a server, a mobile terminal, and two service providers interact and communicate to display information in accordance with some embodiments of the current invention.

FIGS. 5 and 6 illustrate how the devices interact and display information. FIG. 5 is a flowchart illustrative of a network communication method by a computer system including a server, service providers, and a mobile terminal in accordance with some embodiments of the current invention, providing more details and alternatives. FIG. 6 is a schematic illustration of how a server, a mobile terminal, and two service providers interact and communicate to display information in accordance with some embodiments of the current invention.

As indicated by FIG. 5 (step S510) and FIG. 6, the server 602 may define the layout 610 and provide the predefined layout 610 to a first service provider 603 and the second service provider 604. In addition, as shown in steps S520 and S530 of FIG. 5 and referring to FIG. 6, the first service provider 603 and the second service provider 604 may design interfaces including a first set or a second set of actionable options based on the predefined layout 610. Moreover, the first service provider 603 and the second service provider may send the contents 615 or 625 to the server. In some embodiments, the contents 615 and 625 include the customized interfaces and information related to the customized interfaces, such as but not limited to information that is to be displayed when the actionable options are selected.

As indicated by step S501 of FIG. 5 and step 630 of FIG. 6, the mobile terminal 601 may choose to follow a first public account and a second public account respectively associated with the service provider 603 and 604 through the server 602. In some embodiments, the first service provider has a first public account registered with the server and the second service provider has a second public account registered with the server. In some embodiments, the mobile terminal may registered with the server and choose to follow the first public account and the second public account. Following the public accounts allow the mobile terminal to access the contents provided by the service providers to the server.

Steps S502, S503, S504, S505 and S506 in FIG. 5 largely correspond to steps S201, S202, S203, S204, and S205 of FIG. 2, respectively.

As shown in FIGS. 5 and 6, the mobile terminal 601 may display a first interface or interfaces including a first set of actionable options (step 640). In response to a user selection, the mobile terminal 601 may send a request 645 to the server 602 and receive a response 650 from the server 602. In some embodiments, as shown in step 655, the server may exchange information with the first service provider 603 in order to generate the response 650 to the request 645 from the mobile terminal 601. For example, when the request is to access information that is still stored and/or controlled by the first service provider 603, the server 602 may need to exchange information with the first service provider 603 to gain access. This step is optional and may not be needed in some scenarios. The response 650 may be displayed by the mobile terminal 601 in step 657.

As shown in FIGS. 5 and 6, after detecting a user request to switch, the mobile terminal 601 may switch from displaying the first interface or interfaces of the first provider 603 to displaying the second interface or interfaces of the second service provider 604, wherein the second interfaces include a second set of actionable options (step 660). Similarly, in response to a user selection, the mobile terminal 601 may send a request 665 to the server 602 and receive a response 670 from the server 602. In some embodiments, as shown in step 675, the server 602 may exchange information with the second service provider 604 in order to generate the response 670 to the request 645 from the mobile terminal 601. For example, when the request is to access information that is still stored and/or controlled by the second service provider 604, the server 602 may need to exchange information with the second service provider 604 to gain access. This step is optional and may not be needed in some scenarios. The response 670 may be displayed by the mobile terminal 601 in step 680.

FIGS. 7-11 illustrate the computer system that may be used to perform the methods described in FIGS. 1-6. To avoid redundancy, not all the details and variations described for the method are herein included for the computer system. Such details and variations should be considered included for the description of the devices as long as they are not in direct contradiction to the specific description provided for the methods.

Figure 7:
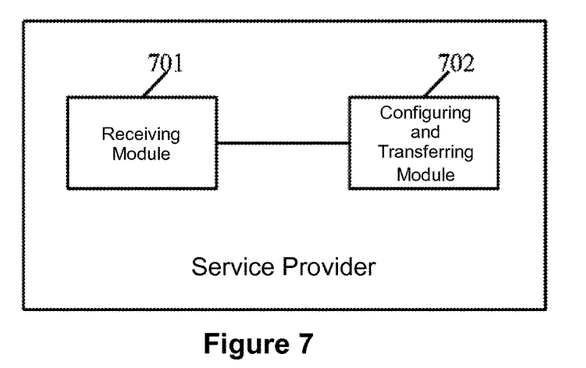
FIG. 7 is a block diagram illustrative of a service provider in accordance with some embodiments of the current invention.

FIG. 7 is a block diagram illustrative of a service provider in accordance with some embodiments of the current invention. Shown in FIG. 7 is the service provider having a receiving module 701 and a configuring and transferring module 702, wherein the receiving module 701 is configured to receive a predefined layout from the server, the configuring and transferring module is configured to customize the predefined layout to generate user interfaces with actionable options and to transfer the interfaces to the server for further distribution. In addition, the receiving module 701 may be configured to receive inquiries from the server and the configuring and transferring module 702 may be configured to provide information related to the inquiries to the server.

Figure 8:
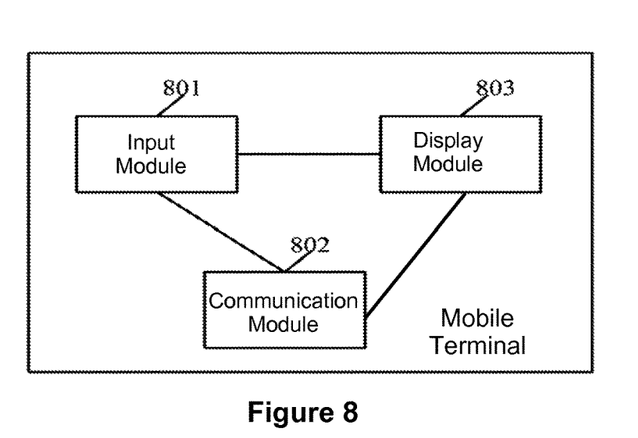
FIG. 8 is a block diagram illustrative of a mobile terminal in accordance with some embodiments of the current invention.

FIG. 8 is a block diagram illustrative of a mobile terminal in accordance with some embodiments of the current invention. The mobile terminal may have one or more processors, memory, and one or more program modules stored in the memory and configured for execution by the one or more processors. FIG. 8 depicts a mobile terminal having an input module 801, a communication module 802, and a display module 803.

The display module 803 may be configured to display a first interface associated with a first service provider, the first interface including a first set of actionable options arranged in a predefined layout, each option having an associated operation defined by the first service provider. The communication module 802 may be configured to submit a request to a remote server and receiving a response from the remote server, in response to a user selection of one of the actionable options in the first set, wherein the display module 802 may be further configured to display the response on the mobile terminal. The input module 801 may be configured to detect a user request to switch from the first interface associated with the first service provider to a second interface associated with a second service provider; wherein the display module 803 may be further configured to display the second interface associated with the second service provider. In some embodiments, the second interface may include a second set of actionable options arranged in the predefined layout; at least one of the second set of actionable options is different from the first set of actionable options; at least one of the second set of actionable options is the same as the first set of actionable options; and each actionable option in the second set has an associated operation defined by the second service provider. In some embodiments, the communication module 802 may be further configured to submit a request to the remote server and receive a response from the remote server, in response to a user selection of one of the actionable options in the second set, and the display module 803 may be further configured to display the response on the mobile terminal.

Figure 9:
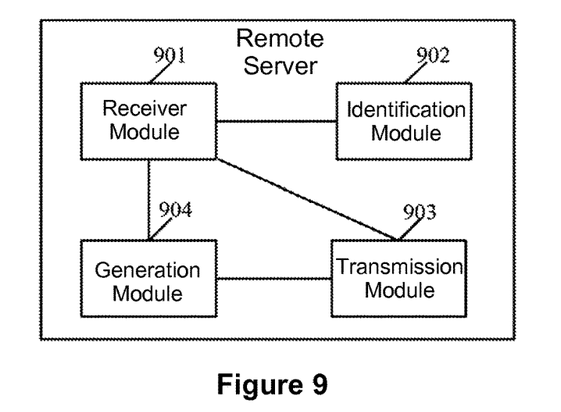
FIG. 9 is a block diagram illustrative of a remote server in accordance with some embodiments of the current invention.

FIG. 9 is a block diagram illustrative of a remote server in accordance with some embodiments of the current invention. FIG. 9 depicts a remote server having a receiver module 901, an identification module 902, a transmission module 903, and a generation module 904. The generation module 904 may be configured to generate the predefined layout; the transmission module 903 may be configured to transfer the predefined layout to a service provider; the receiver module 901 may be configured to receive the customized interfaces with actionable options from the service providers; the transmission module 903 may be further configured to transmit the interfaces to mobile terminals; and the identification module 902 may be configured to verify the identity of the service providers and the mobile terminals to maintain security and lower risk.

Figure 10:
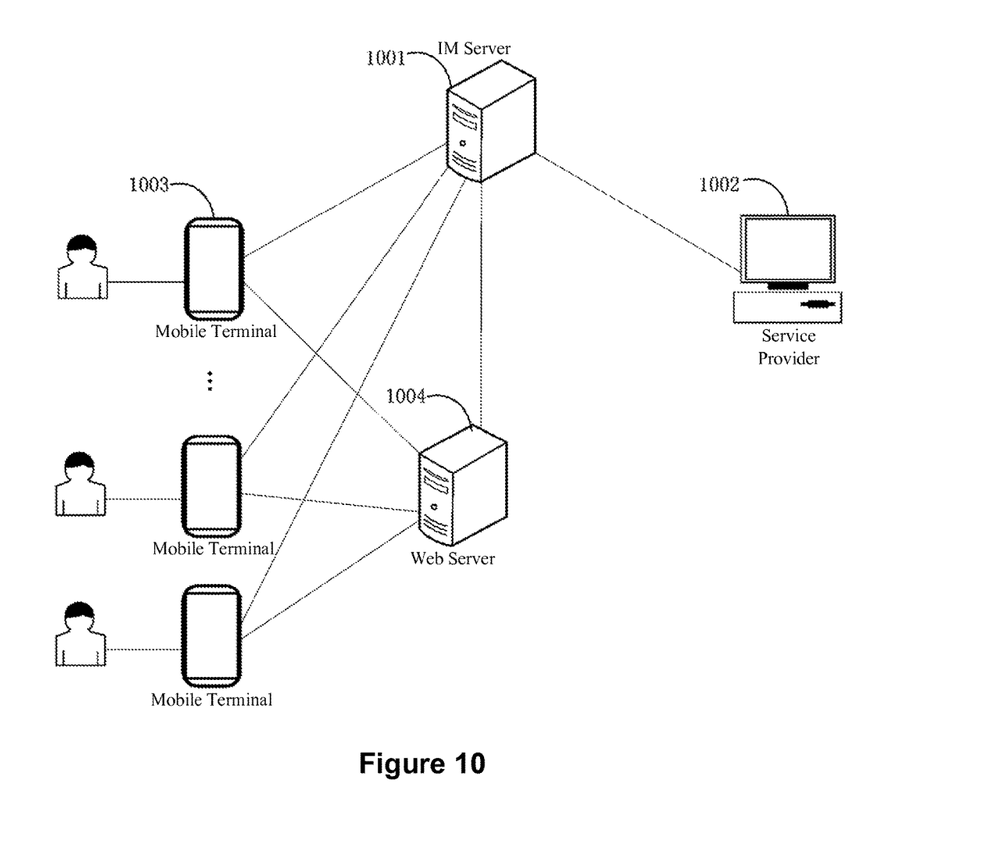
FIG. 10 is the structure diagram of a network communication system in accordance with some embodiments of the current invention.

FIG. 10 is the structure diagram of a network communication system in accordance with some embodiments of the current invention. As indicated in FIG. 10, there may be a plurality of mobile terminals 1003 being connected to a network. An instant messaging server (IM server) 1001, a web server 1004, and one or more service providers 1002 may also be connected in the network. The IM server 1001 and the web server 1004 may be connected to each other and to individual mobile terminals 1003, whereas the service provider 1004 is connected to the IM server 1001. The IM server 1001 may be responsible for providing the predefined layout to the service provider 1002, receiving the customized interfaces from the service provider 1002, and distributing the interfaces to the mobile terminals 1003. The IM server 1001 may also be responsible for registration of the public accounts associated with the service provider 1002 and registration of the mobile terminals 1003. The web server 1004 may be configured to process the requests from the mobile terminals 1003 when the actionable options are selected by users of the mobile terminals 1003. The IM server 1001 and the web server 1004 may exchange information so that the requests can be processed more efficiently and promptly.

Figure 11:
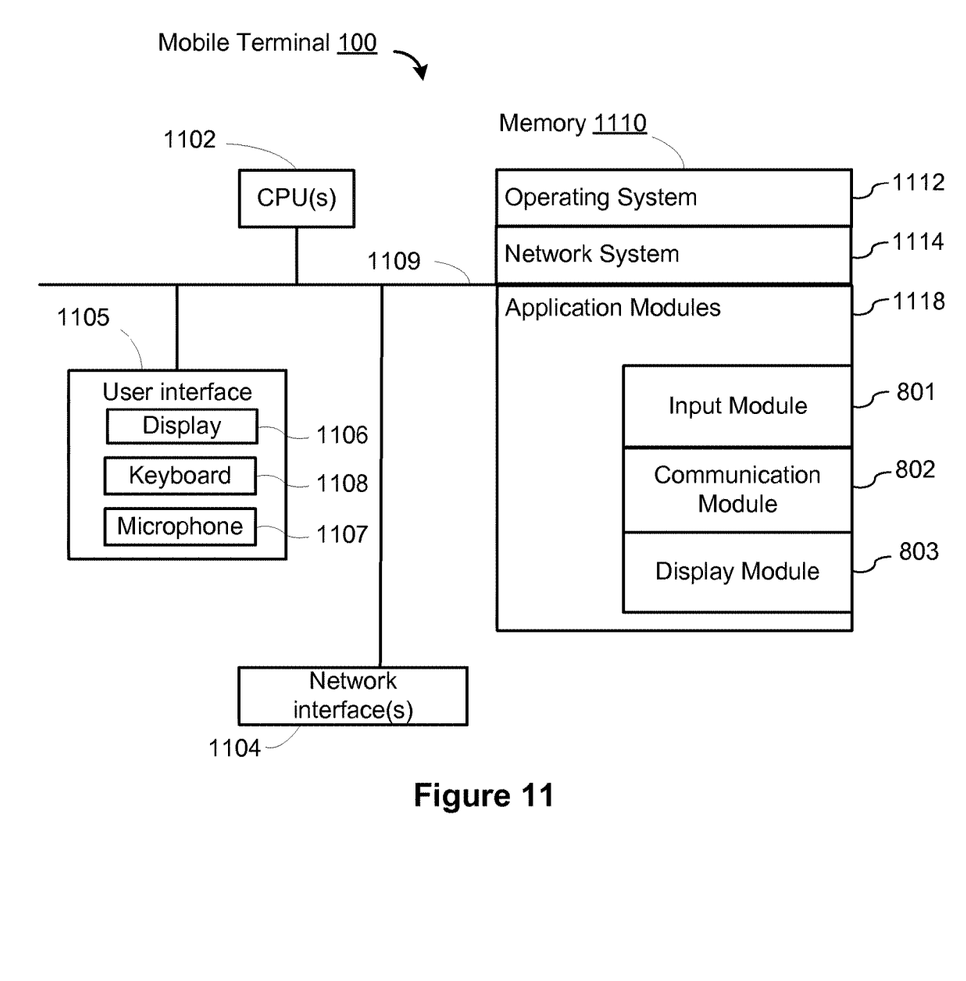
FIG. 11 is a block diagram of a mobile terminal in accordance with some embodiments of the current invention.

FIG. 11 is a block diagram of a mobile terminal in accordance with some embodiments of the current invention. The exemplary mobile terminal 100 typically includes one or more processing units (CPU's) 1102, one or more network interfaces 1104, memory 1110, and one or more communication buses 1109 for interconnecting these components. The communication buses 1109 may include circuitry (sometimes called a chipset) that interconnects and controls communications between system components. The mobile terminal 100 may include a user interface 1105, for instance, a display 1106, a keyboard 1108, and a microphone 1107. When the mobile terminal 100 is a smart phone or tablet, the user interface 1105 may include a touch screen, which is both a display and an input device. Memory 1110 may include high speed random access memory and may also include non-volatile memory, such as one or more magnetic disk storage devices. Memory 1110 may include mass storage that is remotely located from the CPU's 1102. In some embodiments, memory 1110 stores the following programs, modules and data structures, or a subset or superset thereof:

- an operating system 1112 that includes procedures for handling various basic system services and for performing hardware dependent tasks;
- a network module 1114 that is used for connecting the mobile terminal 100 to a server, other mobile terminals, and/or other computers via one or more communication networks (wired or wireless), such as the Internet, other wide area networks, local area networks, metropolitan area networks, and so on;
- and a number of application modules 1118 including the following:
- a receiving portal 301 configured to receive status control instructions;
- A display module 803 configured to display interfaces associated with service providers, wherein the interfaces include actionable options arranged in a predefined layout, each option having an associated operation defined by the service provider; the display module 803 being further configured to display responses to mobile terminal requests from a server;
- A communication module 802 configured to submit a request to a remote server and receiving a response from the remote server, in response to a user selection of one of the actionable options in the first set,
- An input module 801 configured to detect a user request to switch from a first interface associated with a first service provider to a second interface associated with a second service provider; wherein the second interface including a second set of actionable options arranged in the predefined layout; at least one of the second set of actionable options is different from the first set of actionable options; at least one of the second set of actionable options is the same as the first set of actionable options; and each actionable option from the second set has an associated operation defined by the second service provider.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for information display at a mobile terminal, the method comprising:

at the mobile terminal having one or more processors and memory storing programs executed by the one or more processors:

subscribing, by a user, on an instant messaging application, to a first public account registered with the instant messaging application by a first service provider, wherein the first service provider submits one or more information items to the instant messaging application via the first public account;

subscribing, by the user, on the instant messaging application, to a second public account registered with the instant messaging application by a second service provider, wherein the second service provider submits one or more information items to the instant messaging application via the second public account, and wherein the user, the first service provider, and the second service provider are users of the instant messaging application connected through an instant messaging server, wherein the instant messaging server is responsible for registration of the public accounts associated with the first service provider and the second service provider and managing communications between the user and the first service provider and the second service provider, respectively;

displaying a first information display interface associated with the first public account and the first service provider, the first information display interface including an input switch button, one or more of the information items submitted by the first service provider via the first public account, and a first set of actionable options arranged in a predefined layout, each actionable option of the first set having an associated operation supported by the instant messaging application and customized by the instant messaging application in accordance with instructions from the first service provider, wherein user selection of the input switch button of the first information display interface switches the display of the first information display interface to display of a first input interface that includes a first plurality of input options distinct from the first set of actionable options;

in response to a user selection by the user of one of the actionable options in the first set, submitting a request to the instant messaging server, receiving a response from the instant messaging server, the response including one or more of the information items submitted by the first service provider to the instant messaging server via the first public account, and displaying the response on the display of the mobile terminal;

detecting a user request by the user to switch from the first information display interface associated with the first public account and the first service provider to a second information display interface associated with the second public account and the second service provider;

displaying the second information display interface associated with the second public account and the second service provider, the second information display interface including an input switch button, one or more of the information items submitted by the second service provider via the second public account, and a second set of actionable options arranged in the predefined layout, wherein at least one of the second set of actionable options is different from the first set of actionable options, at least one of the second set of actionable options is the same as the first set of actionable options, and each actionable option of the second set has an associated operation supported by the instant messaging application and customized by the instant messaging application in accordance with instructions from the second service provider, and wherein user selection of the input switch button of the second information display interface switches the display of the second information display interface to display of a second input interface that includes a second plurality of input options distinct from the second set of actionable options, wherein the second plurality of input options are the same as the first plurality of input options; and in response to a user selection by the user of one of the actionable options in the second set, submitting a request to the instant messaging server, receiving a response from the instant messaging server, the response including one or more of the information items submitted by the second service provider to the instant messaging server via the second public account, and displaying the response on the display of the mobile terminal.

2. The method of claim 1, wherein:
the predefined layout is defined by the instant messaging server.

3. The method of claim 1, wherein:
the first plurality of input options and the second plurality of input options include a same option allowing a user to input information.

4. The method of claim 1, wherein:
the first plurality of input options and the second plurality of input options include a same option associated with switching between user input formats.

5. The method of claim 4, wherein:
the user input formats comprise a verbal input format and a written input format.

6. The method of claim 1, wherein:
the predefined layout includes a plurality of preset locations, and the actionable options are presented at the preset locations.

7. The method of claim 6, wherein:
the at least one of the same actionable options from the first set and the second set are presented at a same preset location.

8. A computer system comprising a mobile terminal, wherein the mobile terminal has one or more processors, memory, and one or more program modules stored in the memory and configured for execution by the one or more processors, the one or more program modules including:

a communication module configured to subscribe a user, on an instant messaging application, to a first public account registered with the instant messaging application by a first service provider, wherein the first service provider submits one or more information items to the instant messaging application via the first public account;

wherein the communication module is further configured to subscribe the user, on the instant messaging application, to a second public account registered with the instant messaging application by a second service provider, wherein the second service provider submits one or more information items to the instant messaging application via the second public account, and wherein the user, the first service provider, and the second service provider are users of the instant messaging application connected through an instant messaging server, wherein the instant messaging server is responsible for registration of the public accounts associated with the first service provider and the second service provider and managing communications between the user and the first service provider and the second service provider, respectively;

a display module configured to display a first information display interface associated with the first public account and the first service provider, the first information display interface including an input switch button, one or more of the information items submitted by the first service provider via the first public account, and a first set of actionable options arranged in a predefined layout, each actionable option of the first set having an associated operation supported by the instant messaging application and customized by the instant messaging application in accordance with instructions from the first service provider, wherein user selection of the input switch button of the first information display interface switches the display of the first information display interface to display of a first input interface that includes a first plurality of input options distinct from the first set of actionable options;

wherein the communication module is further configured to submit a request to the instant messaging server and receive a response from the instant messaging server, in response to a user selection by the user of one of the actionable options in the first set, wherein the response from the remote server includes one or more of the information items submitted by the first service provider to the instant messaging server via the first public account, and the display module is further configured to display the response on the mobile terminal;

an input module configured to detect a user request by the user to switch from the first information display interface associated with the first public account and the first service provider to a second information display interface associated with the second public account and the second service provider;

wherein the display module is further configured to display the second information display interface associated with the second public account and the second service provider, the second information display interface including an input switch button, one or more of the information items submitted by the second service provider via the second public account, and a second set of actionable options arranged in the predefined layout, wherein at least one of the second set of actionable options is different from the first set of actionable options, at least one of the second set of actionable options is the same as the first set of actionable options, and each actionable option of the second set has an associated operation supported by the instant messaging application and customized by the instant messaging application in accordance with instructions from the second service provider, and wherein user selection of the input switch button of the second information display interface switches the display of the second information display interface to display of a second input interface that includes a second plurality of input options distinct from the second set of actionable options, wherein the second plurality of input options are the same as the first plurality of input options;

wherein the communication module is further configured to submit a request to the instant messaging server and receive a response from the instant messaging server in response to a user selection by the user of one of the actionable options in the second set, wherein the response includes one or more of the information items submitted by the second service provider to the instant messaging server via the second public account, and the display module is further configured to display the response on the mobile terminal.

9. The computer system of claim 8, wherein:
the predefined layout is defined by the instant messaging server.

10. The computer system of claim 8, wherein:
the first plurality of input options and the second plurality of input options include a same option allowing a user to input information.

11. The computer system of claim 8, wherein:
the first plurality of input options and the second plurality of input options include a same option associated with switching between user input formats.

12. The computer system of claim 11, wherein:
the user input formats comprise a verbal input format and a written input format.

13. The computer system of claim 8, wherein:
the predefined layout includes a plurality of preset locations, and the actionable options are presented at the preset locations.

14. The computer system of claim 13, wherein:
the at least one of the same actionable options from the first set and the second set are presented at a same preset location.

15. A non-transitory computer readable storage medium having stored therein one or more instructions, which, when executed by a mobile terminal, cause the mobile terminal to:
subscribe a user, on an instant messaging application, to a first public account registered with the instant messaging application by a first service provider, wherein the first service provider submits one or more information items to the instant messaging application via the first public account;
subscribe the user, on the instant messaging application, to a second public account registered with the instant messaging application by a second service provider, wherein the second service provider submits one or more information items to the instant messaging application via the second public account, and wherein the user, the first service provider, and the second service provider are users of the instant messaging application connected through an instant messaging server, wherein the instant messaging server is responsible for registration of the public accounts associated with the first service provider and the second service provider and managing communications between the user and the first service provider and the second service provider, respectively;
display a first information display interface associated with the first public account and the first service provider, the first information display interface including an input switch button, one or more of the information items submitted by the first service provider via the first public account, and a first set of actionable options arranged in a predefined layout, each actionable option of the first set having an associated operation supported by the instant messaging application and customized by the instant messaging application in accordance with instructions from the first service provider, wherein user selection of the input switch button of the first information display interface switches the display of the first information display interface to display of a first input interface that includes a first plurality of input options distinct from the first set of actionable options;

in response to a user selection by the user of one of the actionable options in the first set, submit a request to the instant messaging server, receive a response from the instant messaging server, the response including one or more of the information items submitted by the first service provider to the instant messaging server via the first public account, and display the response on the display of the mobile terminal;

detect a user request by the user to switch from the first information display interface associated with the first public account and the first service provider to a second information display interface associated with the second public account and the second service provider;

display the second information display interface associated with the second public account and the second service provider, the second information display interface including an input switch button, one or more of the information items submitted by the second service provider via the second public account, and a second set of actionable options arranged in the predefined layout, wherein at least one of the second set of actionable options is different from the first set of actionable options, at least one of the second set of actionable options is the same as the first set of actionable options, and each actionable option of the second set has an associated operation supported by the instant messaging application and customized by the instant messaging application in accordance with instructions from the second service provider, and wherein user selection of the input switch button of the second information display interface switches the display of the second information display interface to display of a second input interface that includes a second plurality of input options distinct from the second set of actionable options, wherein the second plurality of input options are the same as the first plurality of input options; and in response to a user selection by the user of one of the actionable options in the second set, submit a request to the instant messaging server, receive a response from the instant messaging server, the response including one or more of the information items submitted by the second service provider to the instant messaging server via the second public account, and display the response on the display of the mobile terminal.

16. The non-transitory computer readable storage medium of claim 15, wherein:
the predefined layout is defined by the instant messaging server.

17. The non-transitory computer readable storage medium of claim 15, wherein:
the first plurality of input options and the second plurality of input options include a same option allowing a user to input information.

18. The non-transitory computer readable storage medium of claim 15, wherein:
the first plurality of input options and the second plurality of input options include a same option associated with switching between user input formats.

* * * * *